(12) United States Patent
Takakuwa (10) Patent No.: US 9,988,120 B2
(45) Date of Patent: Jun. 5, 2018

(54) DIRECTION INDICATOR AND REARVIEW MIRROR STRUCTURE OF VEHICLE

(71) Applicant: HONDA MOTOR CO., LTD., Minato-Ku, Tokyo (JP)

(72) Inventor: Dai Takakuwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 15/202,246

(22) Filed: Jul. 5, 2016

(65) Prior Publication Data

US 2017/0015378 A1  Jan. 19, 2017

(30) Foreign Application Priority Data

Jul. 15, 2015 (JP) .................................. 2015-141588

(51) Int. Cl.

| F21V 5/00 | (2018.01) |
|---|---|
| B62J 29/00 | (2006.01) |
| B60Q 1/26 | (2006.01) |
| B60R 1/06 | (2006.01) |
| B62J 6/00 | (2006.01) |

(Continued)

(52) U.S. Cl.
CPC ............ *B62J 29/00* (2013.01); *B60Q 1/2665* (2013.01); *B60Q 1/34* (2013.01); *B60R 1/06* (2013.01); *B60R 1/1207* (2013.01); *B62J 6/005* (2013.01); *F21S 43/14* (2018.01); *F21S 43/26* (2018.01); *F21S 45/43* (2018.01); *F21V 21/14* (2013.01); *F21Y 2115/10* (2016.08)

(58) Field of Classification Search
CPC ......... B62J 29/00; B62J 6/005; B60Q 1/2665; B60Q 1/34; F21S 48/215; F21S 48/2212; F21S 48/328
See application file for complete search history.

(56) References Cited

U.S. PATENT DOCUMENTS 6,817,742 B2 * 11/2004 Lin ...................... B60Q 1/2665
362/492
6,926,431 B1 * 8/2005 Foote ................... B60Q 1/2665
362/134

(Continued)

FOREIGN PATENT DOCUMENTS

| EP | 1 923 265 A2 | 5/2008 |
| JP | 2009-073286 A | 4/2009 |

(Continued)

*Primary Examiner* — Alexander Garlen
(74) *Attorney, Agent, or Firm* — Carrier Blackman & Associates, P.C.; William D. Blackman; Joseph P. Carrier (57) ABSTRACT

A direction indicator and rearview mirror structure for a vehicle includes a direction indicator and a rearview mirror having a mirror housing. The direction indicator angularly and adjustably supports the mirror housing. The mirror housing is mounted with at least a part thereof disposed above and in front of the direction indicator. In a plan view, the mirror housing overlaps the direction indicator at least partially and covers the direction indicator from above. A recessed portion housing an upper part of a vehicle-width-wise outer part of the direction indicator is formed in a lower part of the mirror housing. In a side view, a front part of the recessed portion with respect to a vehicle body protrudes forward and downward with respect to the vehicle body and serves as an eaves portion covering a front upper part of the direction indicator.

17 Claims, 10 Drawing Sheets

(51) Int. Cl.
*B60Q 1/34* (2006.01)
*F21V 21/14* (2006.01)
*B60R 1/12* (2006.01)
*F21Y 115/10* (2016.01)

(56) References Cited

U.S. PATENT DOCUMENTS

| | | | |
|---|---|---|---|
| 6,981,789 B2 * | 1/2006 | Assinder | B60R 1/1207 |
| | | | 362/142 |
| 7,845,835 B2 | 12/2010 | Kuboshima et al. | |
| 8,262,267 B2 | 9/2012 | Tsuda et al. | |
| 8,297,812 B2 * | 10/2012 | Maruyama | B60Q 1/0041 |
| | | | 362/473 |
| 9,440,702 B2 | 9/2016 | Tako et al. | |
| 2001/0036081 A1 * | 11/2001 | Gilbert | B60Q 1/2665 |
| | | | 362/494 |
| 2004/0129853 A1 * | 7/2004 | Suzuki | B60Q 1/2665 |
| | | | 248/475.1 |
| 2008/0117643 A1 * | 5/2008 | Matsumura | B60R 1/1207 |
| | | | 362/494 |
| 2009/0073704 A1 * | 3/2009 | Kuboshima | B60Q 1/2665 |
| | | | 362/473 |

FOREIGN PATENT DOCUMENTS

| | | |
|---|---|---|
| JP | 2010-036802 A | 2/2010 |
| JP | 2014-108650 A | 6/2014 |

* cited by examiner

DIRECTION INDICATOR AND REARVIEW MIRROR STRUCTURE OF VEHICLE

CROSS-REFERENCE TO RELATED APPLICATIONS

The present invention claims priority under 35 USC 119 based on Japanese Patent Application No. 2015-141588, filed on Jul. 15, 2015. The entire subject matter of this priority document, including specification claims and drawings thereof, is incorporated by reference herein.

BACKGROUND

The present invention relates to a direction indicator and rearview mirror structure of a vehicle, and particularly relates to a structure of a vehicle which integrally provides a front direction indicator and a rearview mirror.

Heretofore, a vehicle equipped with direction indicators and rearview mirrors may include a direction indicator on the front side of the vehicle that is provided integrally in a housing of the rearview mirror.

Japanese Patent Application Publication No. 2009-73286 discloses a direction indicator structure of a motorcycle in which a mirror housing is angularly adjustably mounted on the tip of a rod-shaped stay extending outward in the vehicle widthwise direction from a cowling, and a direction indicator is embedded in a front part of the rod-shaped stay with respect to a vehicle body.

However, in the structure of Japanese Patent Application Publication No. 2009-73286, the entire rod-shaped stay is exposed toward the front of the vehicle body, thereby allowing irradiation light from the sunshine or vehicles in the opposing lane to likely hit the direction indicator. If this irradiation light is reflected toward the front of the vehicle body, the operating condition of the direction indicator may become hard to recognize by viewers such as pedestrians.

The present disclosure seeks to solve the problem of the existing technique described above by providing a direction indicator structure of a vehicle which enables a direction indicator included integrally on a stay of a rearview mirror to be visually identified more easily.

SUMMARY

In order to achieve the above objective, a direction indicator and rearview mirror structure for a vehicle includes a direction indicator for a vehicle that emits a forward blinking light for announcing a change of direction of the vehicle and a rearview mirror having a mirror housing which supports a mirror body. The direction indicator angularly and adjustably supports the mirror housing. The mirror housing is mounted with at least a part of the mirror housing disposed above and in front of the direction indicator.

In a second aspect of the present disclosure, in a plan view, the mirror housing overlaps the direction indicator at least partially and covers the direction indicator from above.

In a third aspect of the present disclosure, a recessed portion which houses an upper part of a vehicle-widthwise outer part of the direction indicator is formed in a lower part of the mirror housing. In a side view, a front part of the recessed portion with respect to a vehicle body protrudes forward and downward with respect to the vehicle body and serves as an eaves portion which covers a front upper part of the direction indicator.

In a fourth aspect of the present disclosure, the direction indicator includes a heat sink which is exposed on a rear side of the direction indicator with respect to the vehicle body. A direction indicator lens surface of the direction indicator has a wedge shape splitting traveling wind into upper and lower streams, and is configured so as to allow the traveling wind introduced through the space between the eaves portion and the direction indicator lens surface to be discharged to the rear through the space between the direction indicator and the recessed portion thereby cooling the heat sink.

In a fifth aspect of the present disclosure, an outer end part of the direction indicator in the vehicle widthwise direction is located at a position outside the center of the mirror housing in the vehicle widthwise direction.

In a sixth aspect of the present disclosure, at least one light source is placed in the direction indicator at a position overlapping the mirror housing in a plan view.

In a seventh aspect of the present invention, a housing support portion, which is provided on the direction indicator and angularly adjustably supports the mirror housing, is placed facing upward at a position inward of the end part of the direction indicator.

According to the first aspect, the rearview mirror includes: the mirror housing which supports the mirror body; and the direction indicator which serves also as the support portion angularly adjustably supporting the mirror housing, and the mirror housing is mounted so that at least a part of the mirror housing is located above and in front of the direction indicator. Since the rearview mirror is partially provided in front of the direction indicator, this achieves a structure in which the rearview mirror shields a part of irradiation light coming from the outside toward the direction indicator. This makes it possible to suppress a situation where the direction indicator becomes less easily visually identified due to irradiation light from the outside environment such as the sunshine or headlights of vehicles in the opposing lane. In addition, since the mirror housing of the rearview mirror is provided above the direction indicator, the rearview mirror is less likely to project in the vehicle widthwise direction, whereby the vehicle-widthwise size of the vehicle can be reduced.

According to the second aspect, in the plan view, the mirror housing overlaps the direction indicator at least partially and covers the direction indicator from above. Thus, even in the case where no irradiation light from the outside hits the direction indicator, this layout implements a design that emphasizes the direction indicator, whereby the visibility of the direction indicator can be improved.

According to the third aspect, the recessed portion which houses the upper part of the vehicle-widthwise outer part of the direction indicator is formed in the lower part of the mirror housing and, in the side view, the front part of the recessed portion with respect to the vehicle body protrudes forward and downward with respect to the vehicle body and serves as the eaves portion which covers the front upper part of the direction indicator. Thus, light that falls on the direction indicator from the front upper side with respect to the vehicle body can be shielded by the eaves portion. The recessed portion provided in the lower part of the mirror housing enables the mirror housing to function also as eaves without a significant change in the appearance of the mirror housing.

According to the fourth aspect, the direction indicator includes the heat sink which is exposed on the rear side of the direction indicator with respect to the vehicle body, and the direction indicator lens surface of the direction indicator has a wedge shape splitting traveling wind into upper and lower streams, and is configured so as to allow the traveling wind introduced through the space between the eaves portion and the direction indicator lens surface to be discharged to the rear through the space between the direction indicator and the recessed portion while cooling the heat sink. Thus, the heat sink can be actively cooled, whereby the amount of light emission from LED light sources can be increased with the downsized direction indicator.

According to the fifth aspect, the outer end part of the direction indicator in the vehicle widthwise direction is located at a position outside the center of the mirror housing in the vehicle widthwise direction. This increases the amount of overlap in the vehicle widthwise direction between the mirror housing and the direction indicator, and thereby increases an area of the direction indicator overshadowed by the eaves portion provided in the mirror housing when irradiation light from the outside hits them.

According to the sixth aspect, at least one light source is placed in the direction indicator at a position overlapping the mirror housing in the plan view. This enables light to blink in the area overshadowed by the eaves portion.

According to the seventh aspect, the housing support portion which is provided on the direction indicator and angularly adjustably supports the mirror housing is placed, facing upward, at a position inward of the end part of the direction indicator. This enables the direction indicator and the mirror housing to easily overlap each other in the vehicle widthwise direction, and easily implements a layout where an upper part of the direction indicator is covered with the mirror housing. In addition, since the mirror housing which is a heavy object is supported from below, a load to act on their joint portion can be reduced and thereby the wear of the angle adjustment function can be suppressed.

DETAILED DISCLOSURE

Figure 1:
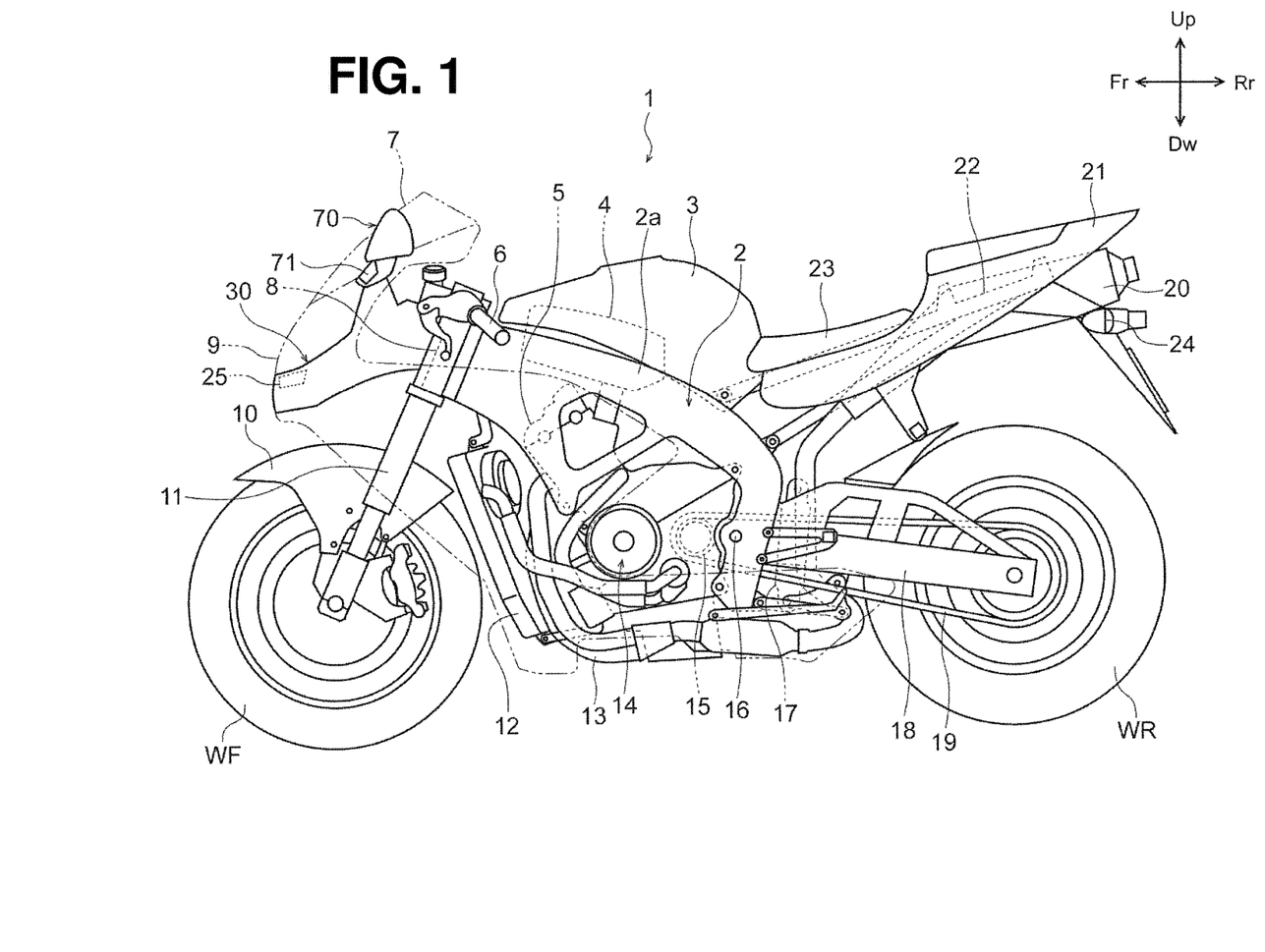
FIG. 1 is a left side view of a motorcycle (vehicle) employing a direction indicator and rearview mirror structure of a vehicle according to of the present disclosure.

FIG. 1 depicts a left side view of a motorcycle (vehicle) 1 employing a direction indicator and rearview mirror structure. A body frame 2 of the motorcycle 1 has two main frames 2a which support an engine 14 by pinching it from the left and right in the vehicle widthwise direction. The front ends of the main frames 2a are fixed on a head pipe 8 which axially and steerably supports a pair of front forks 11. A front wheel WF is axially and rotatably supported by the lower ends of the paired left and right front forks 11, and a steering handlebar 6 is fixed on the upper ends of the front forks 11. A front fender 10 which covers an upper part of the front wheel WF is mounted on the pair of front forks 11.

The engine 14 which is a 4-cycle multi-cylinder internal combustion engine is suspended from a lower part of the body frame 2. An intake pipe and an air cleaner box 4 are coupled to a rear part of the cylinder head 5, and an exhaust pipe 13 extending continuously from a muffler 20 is coupled to a front part of the cylinder head 5. A radiator 12 configured to release heat in cooling water of the engine 14 is disposed ahead of the exhaust pipe 13.

A swing arm 18 axially and rotatably supporting a rear wheel WR is axially and swingably supported on a pivot 16 provided in a rear lower part of the body frame 2. Drive force from the engine 14 is transmitted from a drive sprocket 15 fixed on an output shaft of the engine to the rear wheel WR through an endless drive chain 19.

A pair of left and right subframes 22 is mounted on an upper rear part of the body frame 2, and a seat 23 and a seat cowl 21 are fixed on upper parts of the subframes 22. A pair of left and right rear direction indicators 24 is disposed below the muffler 20. A fuel tank 3 having a shape covering the air cleaner box 4 is disposed in front of the seat 23.

A cowling 9 as a windscreen device covers an area ranging from the front side of the steering handlebar 6 to the lower lateral sides of the engine 14. A colorless and clear or colored and clear windscreen 7 is mounted on an upper part of the cowling 9. The cowling 9 covering the front part of the vehicle body is fixed on the body frame 2 mainly with a cowl stay 30. The cowl stay 30 is fixed on a front part of the head pipe 8 and also supports a pair of left and right rearview mirrors 70. The rearview mirrors 70 have support portions configured to serve also as front direction indicators 71 designed to emit forward blinking light for announcing a change of direction of the motorcycle 1.

Figure 2:
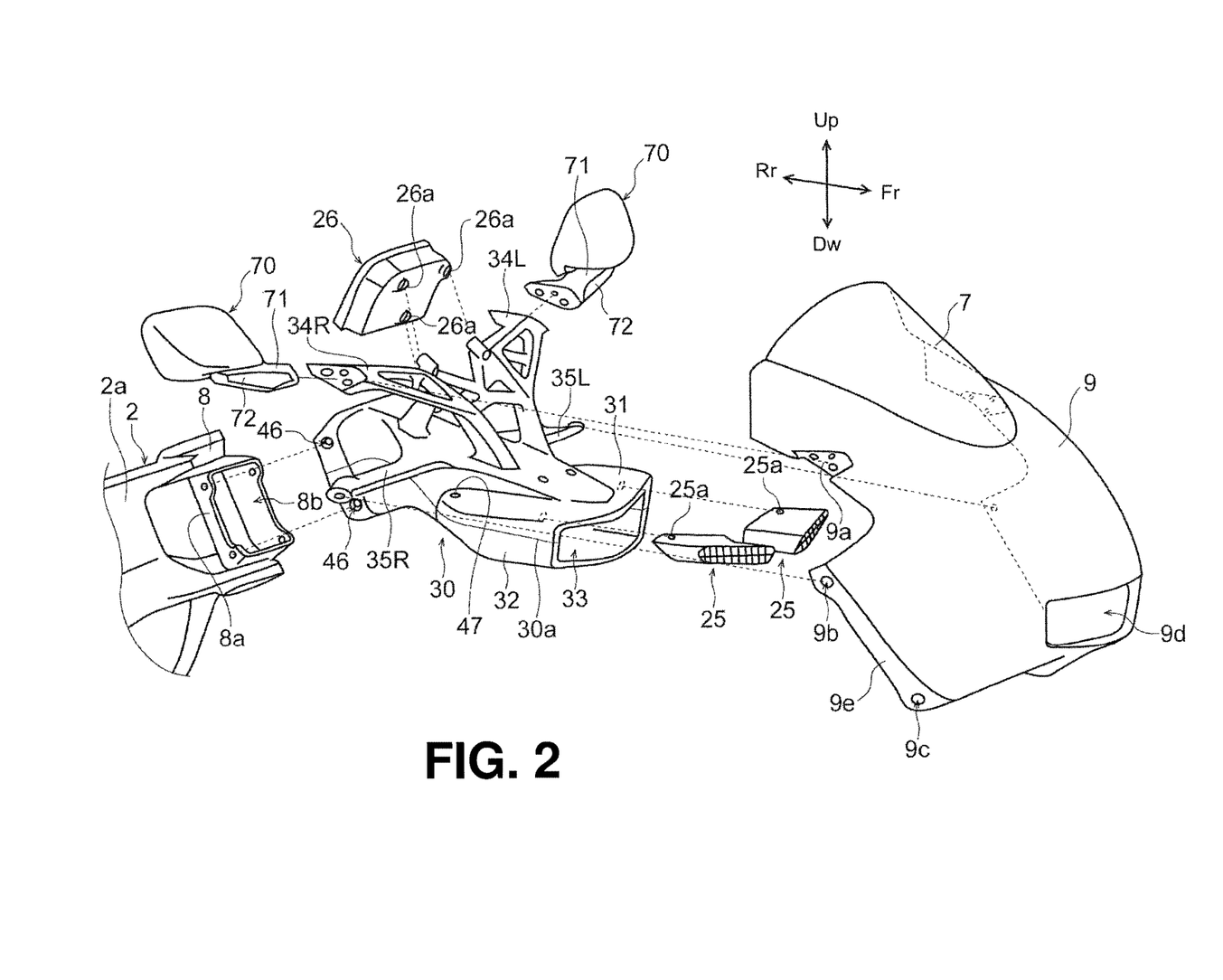
FIG. 2 is a perspective view illustrating an exploded state of a vehicle body front part structure.
Figure 3:
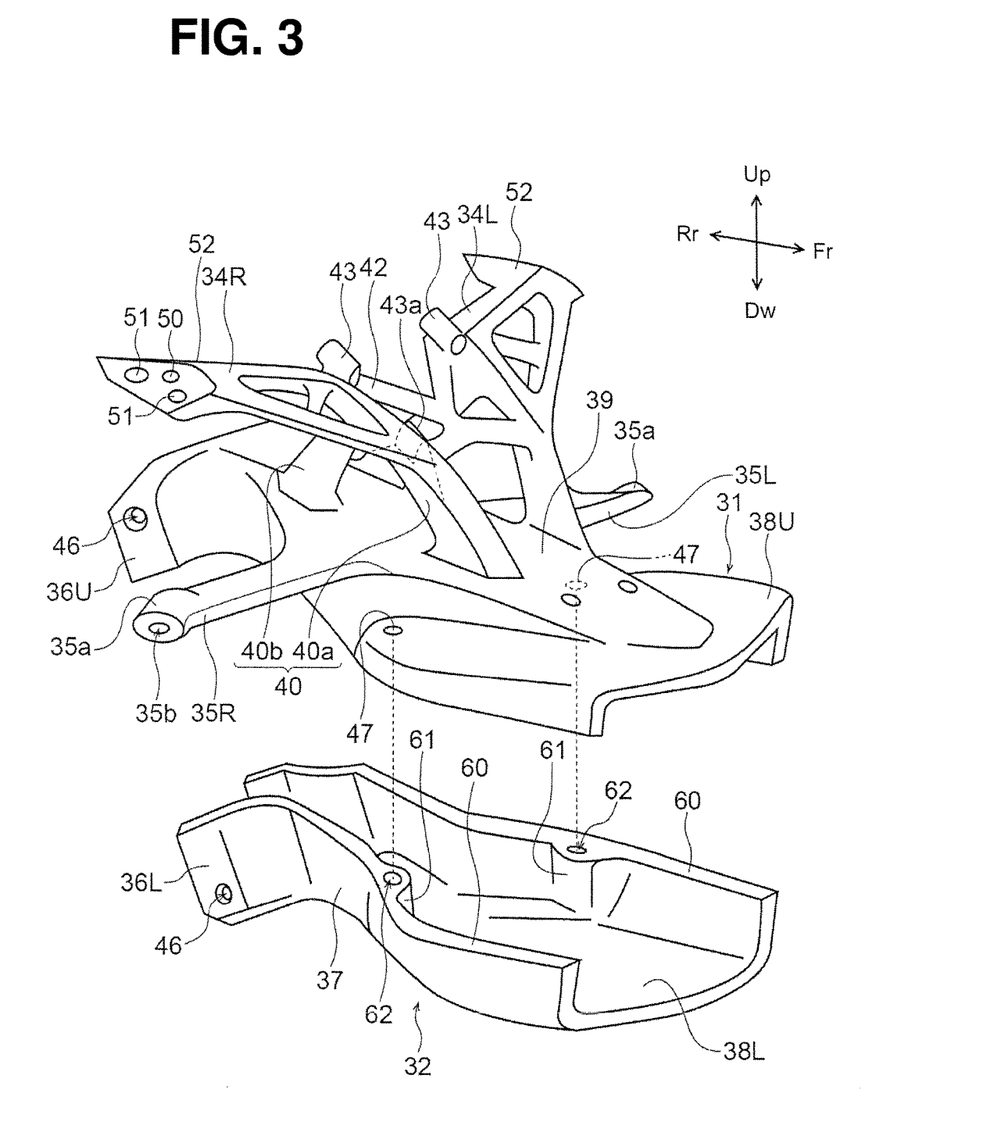
FIG. 3 is a perspective view illustrating a state where a cowl stay is exploded into an upper member and a lower member.
Figure 4:
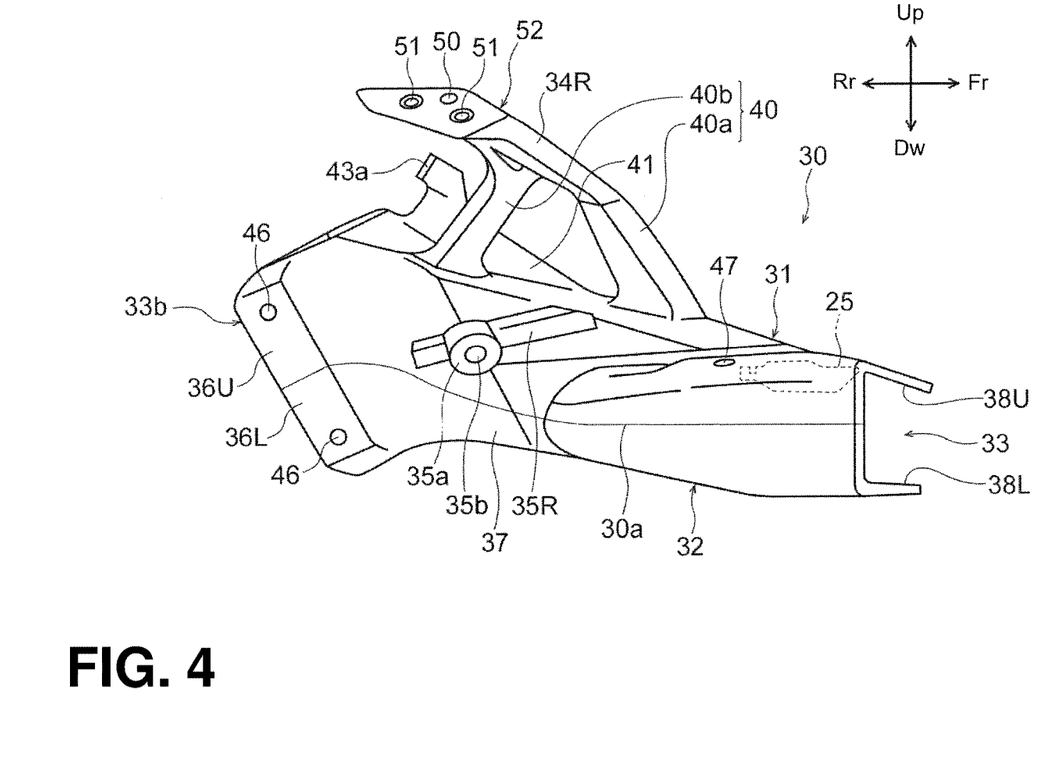
FIG. 4 is a right side view of the cowl stay.

FIG. 2 is a perspective view illustrating an exploded state of a vehicle body front part structure. In addition, FIG. 3 is a perspective view of the cowl stay 30, and FIG. 4 is a perspective view illustrating a state where the cowl stay 30 is exploded into an upper member 31 and a lower member 32.

The cowl stay 30 is fixed on the head pipe 8 of the body frame 2. The head pipe 8 has, on both sides of a steering stem (not illustrated) designed to axially and steerably support the pair of front forks 11, slits for guiding the air introduced through a front opening 33 of the cowl stay 30 located on the front side of the vehicle body directly to the air cleaner box 4 located behind the head pipe 8. The head pipe 8 is provided with a standing wall 8a, which defines a substantially square head pipe opening 8b while surrounding two through holes, in an area ranging from the front surface of the head pipe to the main frames 2a. The cowl stay 30 is fixed on the body frame 2 by putting a box-shaped rear opening 33b formed in the rear end of the cowl stay over the standing wall 8a and fixing them together with a fastening member.

The cowl stay 30 with a hollow structure serves as a duct for guiding the air taken in from the front side of the vehicle body to the air cleaner box 4, and the horizontally-long front opening 33 is formed in a front end part of the cowl stay with respect to the vehicle body. The cowl stay 30 is formed by fixing the upper member 31 made of metal such as aluminum and the lower member 32 made of resin such as ABS together with fastening members such as bolts. A pair of left and right headlight units (headlight) 25 having light-emitting diodes (LEDs) as its light source is placed in the front opening 33. The headlight units 25 are fixed on the lower surface of the upper member 31, which constitutes the front opening 33, with fastening members passing through fastening holes 25a.

The upper member 31 has: first laterally extending portions 34L and 34R which extend outward in the vehicle widthwise direction for supporting the rearview mirrors 70 and the cowling 9; and second laterally extending portions 35L and 35R which extend outward in the vehicle widthwise direction for supporting the cowling 9. The rearview mirrors 70 are respectively fixed on end parts of the first laterally extending portions 34L and 34R with mounting portions 9a of the cowling 9 interposed therebetween. A box-shaped meter device 26 is fixed on rear parts of the first laterally extending portions 34L and 34R. The meter device 26 has three mounting portions 26a.

The cowling (upper cowl) 9 constituting an upper portion of an exterior part is joined to a lower portion (not illustrated) thereof at division portions 9e each having an upper mounting hole 9b and a lower mounting hole 9c. The second laterally extending portions 35L and 35R of the cowl stay 30 support the cowling 9 at the upper mounting holes 9b of the division portions 9e. The second laterally extending portions 35L and 35R are each provided at its end part with a boss 35a having a mounting hole 35b in which a fastening member such as a bolt is to be screwed. A horizontally-long introduction port 93 formed in a front lower part of the cowling 9 engages with the front opening 33 of the cowl stay 30.

Referring to FIG. 3, the upper member 31 and the lower member 32 are joined together at a division line 30a to constitute an air intake duct with a hollow structure having a horizontally-long inlet and a substantially rectangular outlet. The upper member 31 and the lower member 32 are joined together with fastening members (not illustrated) such as bolts which engage with a pair of left and right insertion holes 47 formed in the upper member 31.

A rear opening of the cowl stay 30 is formed from an upper engaging portion 36U formed in the upper member 31 and a lower engaging portion 36L formed in the lower member 32, and they are fixed on the body frame 2 with fastening members (not illustrated) such as bolts passing through fixation holes 46 and being directed in the vehicle widthwise direction.

A pair of left and right upward extending portions 40 is provided on a top portion 39 of the upper member 31. The upward extending portions 40 each have a front upward extending portion 40a and a rear upward extending portion 40b forming a triangular arch. A coupling portion 42 which is shaped substantially in the form of an X as the cowl stay 30 is seen in a plan view and couples the left and right upward extending portions 40 is provided on upper end parts of the respective upward extending portions 40.

The first laterally extending portions 34L and 34R extending outward in the vehicle widthwise direction are coupled together at the upper end parts of the upward extending portions 40 at positions opposite positions where the coupling portion 42 is coupled. A pair of left and right mounting bosses 43 for supporting the meter device 26 is provided on the rear ends of proximal parts of the first laterally extending portions 34L and 34R, and the third mounting boss 43a is provided between the left and right rear upward extending portions 40b.

The first laterally extending portions 34L and 34R each have a truss structure having a thinning hole 45 with a bar-shaped oblique member 44, which largely reduces its weight while keeping its strength. In the upper member 31, its parts including the top portion 39, the first laterally extending portions 34L and 34R, and the second laterally extending portions 35L and 35R are formed as an integrated unit by aluminum casting.

Direction indicator support portions 52 are respectively formed at outer end parts of the first laterally extending portions 34L and 34R in the vehicle widthwise direction. In each direction indicator support portion 52, two fastening holes 51 for fixing the corresponding rearview mirror 70, and an eyelet 50 for a direction indicator harness configured to supply power to the direction indicator 71 serving also as the rearview mirror 70 support portion are formed.

An upper duct half 38U constituting a front end part of the top portion 39 of the upper member 31 and a lower duct half 38L constituting a front end part of the lower member 32 are each shaped in the form of a thin plate for weight reduction. The entire lower member 32 is made of synthetic resin, which enables the cowl stay 30 to largely reduce its weight while keeping the strength of the first laterally extending portions 34L and 34R and the second laterally extending portions 35L and 35R supporting the rearview mirrors 70 and the cowling 9. To form the lower member 32 with synthetic resin leads to weight reduction of a portion of the cowl stay 30 far from the head pipe 8 supporting the cowl stay, which reduces a bending moment to act on the joint portion between the cowl stay and the head pipe and thus reduces a load to be applied on the standing wall 8a.

The lower member 32 comes in contact with the upper member 31 at a flat joint surface 60, and is fastened to the upper member 31 with fastening members (not illustrated) by means of mounting holes 62 of bosses 61 formed inside the lower member. The cowl stay 30 has a tubular shape by joining the upper member 31 and the lower member 32 together, and it becomes the shape of a closed-end box by mounting the cowl stay to the head pipe 8, thus achieving high structural strength. This enables the thinning of the upper member 31 and the lower member 32. At an area reducing portion 37 located at substantially the center of the cowl stay 30 in the longitudinal direction, the shape of the inner space of the cowl stay is deformed into a substantially rectangular shape the area of which is smaller than that of the inlet. This shape reduces the opening size of the head pipe opening 8b of the head pipe 8 as compared with that of the inlet, which makes it possible to increase the flow velocity of traveling wind used as intake air and take in the air efficiently.

Figure 5:
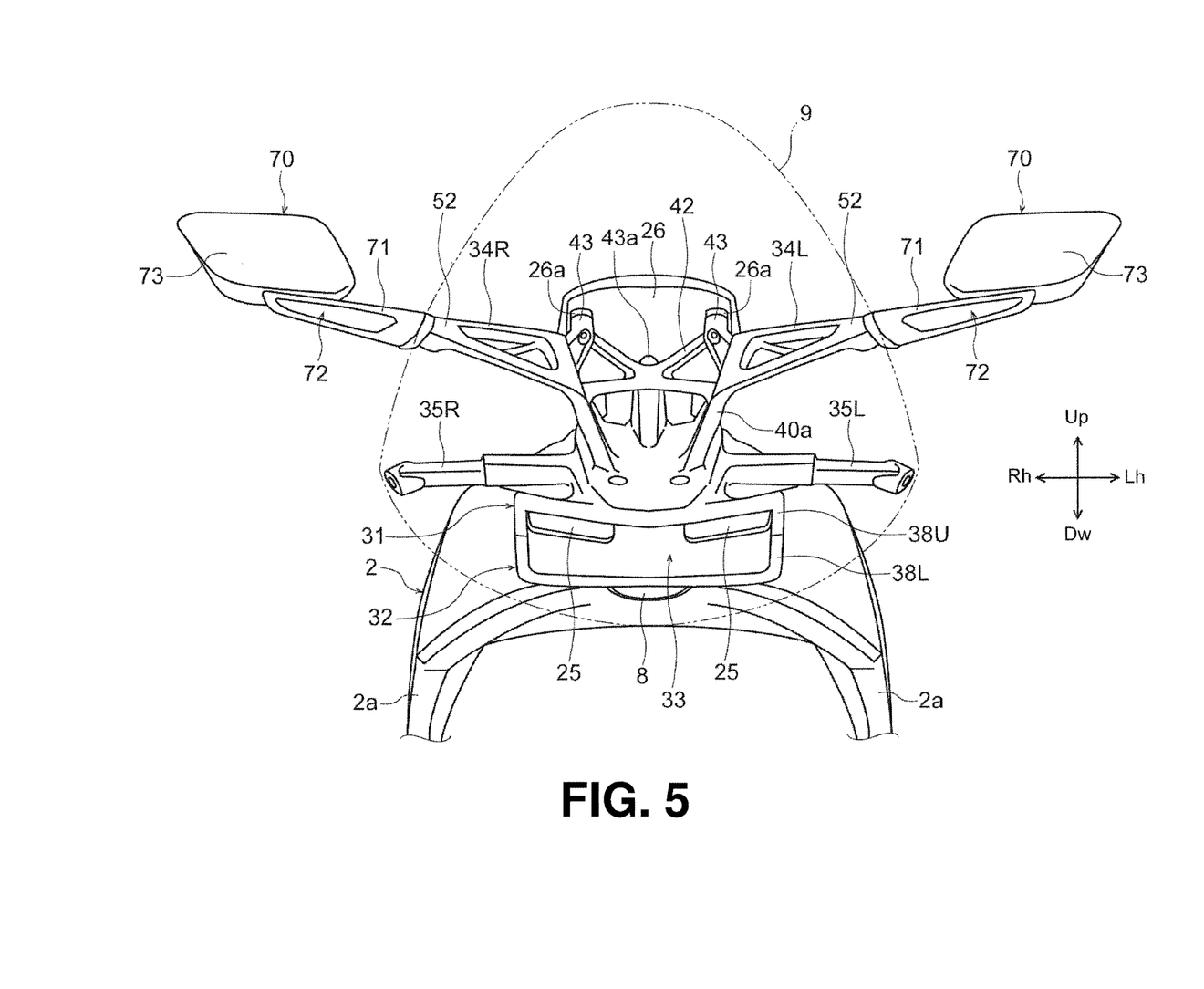
FIG. 5 is a front view illustrating the vehicle body front part structure.

FIG. 4 is a right side view of the cowl stay 30. In addition, FIG. 5 is a front view illustrating the vehicle body front part structure. The upward extending portions 40 each formed from the front upward extending portion 40a and the rear upward extending portion 40b stand on the top portion 39 while tilting outward in the vehicle widthwise direction as the cowl stay 30 is seen in a front view. The X-shaped coupling portion 42 increases strength by coupling the upper ends of the upward extending portions 40 together, and also serves as a stylish design. A lower support portion 41 standing on the top portion 39 to support the mounting boss 43a of the meter device 26 from below is provided below the coupling portion 42.

The second laterally extending portions 35L and 35R coupled to the upper mounting holes 9b of the cowling 9 each have the shape of a stepped round bar. On the other hand, the first laterally extending portions 34L and 34R each have a configuration where a triangular flat plate is thinned, and have a truss structure extending continuously from the coupling portion 42 to increase its strength. Thereby, the cowl stay 30 can be downsized, and the truss structure provides a stylish design. In addition, the second laterally extending portions 35L and 35R extend substantially in the vehicle widthwise direction, whereas the first laterally extending portions 34L and 34R tilt upward toward their outer ends so that they are not visible in front of the meter device 26.

The front opening 33 which is horizontally long in the front view is formed in the front end of the cowl stay 30 by combining the thin plate-shaped upper duct half 38U and lower duct half 38L. The rear opening 33b of the cowl stay 30 is formed in a substantially rectangular shape by the upper engaging portion 36U formed in the upper member 31 and the lower engaging portion 36L formed in the lower member 32.

The paired left and right headlight units 25 are spaced from each other so as to extend along both ends of the upper duct half 38U defining the front opening 33. The front opening 33 has a horizontally-long shape extending to the main frames 2a through the head pipe 8, and the headlight units 25 are actively cooled by the air introduced through the front opening 33.

The rearview mirrors 70 each have: a mirror housing 73 which supports a platy mirror body 75; and the bar-shaped direction indicator 71 supporting the mirror housing 73. The mirror housing 73 and the direction indicator 71 can be made of synthetic resin, for example. A horizontally long-shaped direction indicator lens surface 72 is welded to the direction indicator 71. The first laterally extending portions 34L and 34R and the direction indicators 71 are configured to form a straight line as a whole once the rearview mirrors 70 are mounted on the first laterally extending portions 34L and 34R. The meter device 26 is configured to be housed within the width between the left and right upward extending portions 40 once fixed by means of the three mounting bosses 43, 43, and 43a.

Figure 6:
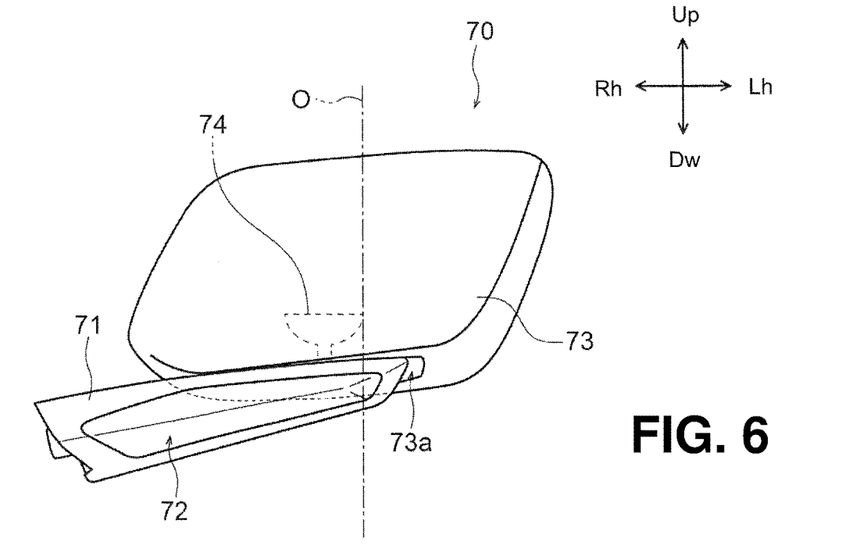
FIG. 6 is a front view of a left rearview mirror.
Figure 7:
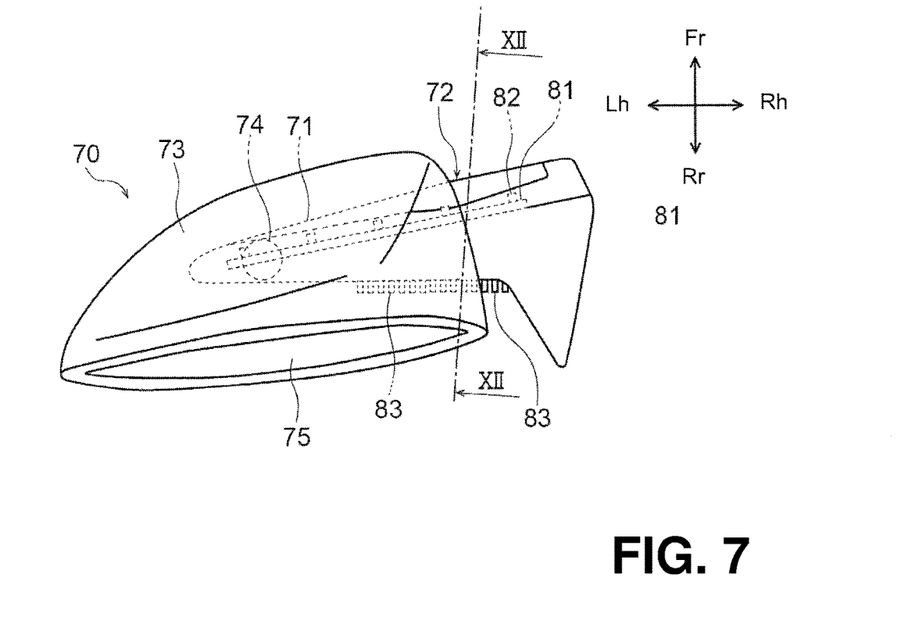
FIG. 7 is a plan view of the left rearview mirror.
Figure 8:
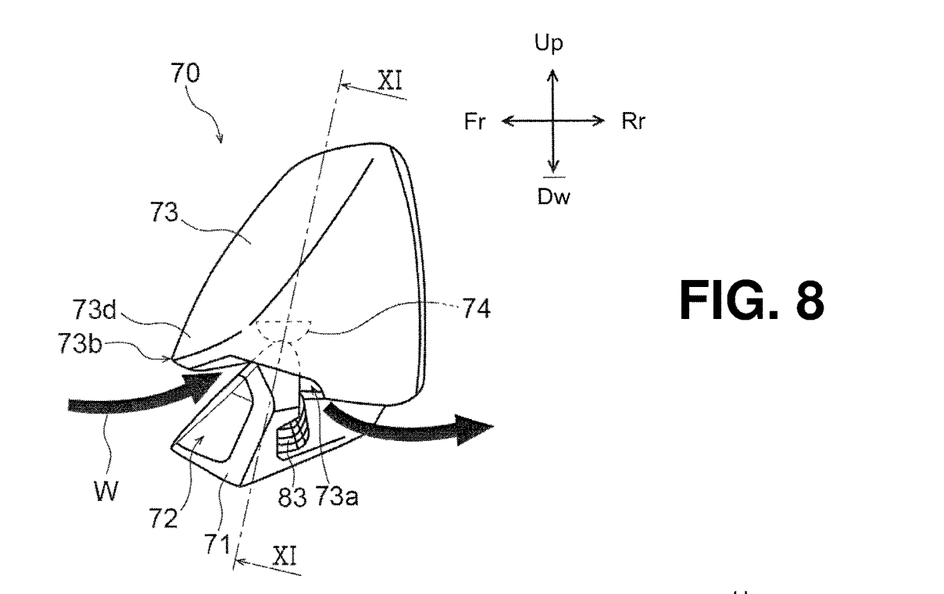
FIG. 8 is a left side view of the left rearview mirror.

FIG. 6 is a front view of the left rearview mirror 70. In addition, FIG. 7 is a plan view of the left rearview mirror and FIG. 8 is a left side view of the left rearview mirror. Since the left and right rearview mirrors 70 have the same structure, the following description is given using only the left rearview mirror.

The rearview mirror 70 has: the mirror housing 73 which supports the platy mirror body 75 and has a substantially parallelogram shape in the front view; and the bar-shaped direction indicator 71 supporting the mirror housing. The mirror housing 73 and the direction indicator 71 are made of synthetic resin, for example. The direction indicator 71 having a polygonal shape in cross section is provided with the direction indicator lens surface 72 long in the vehicle widthwise direction. By employing a structure where the direction indicator 71 is used also as a stay for mounting the rearview mirror 70 on the vehicle body, a reduction in the number of parts and weight is achieved. The direction indicator lens surface 72 is made of orange and clear synthetic resin, for example.

The tip of the direction indicator 71 extends to a position outside the center of the mirror housing 73 in the vehicle widthwise direction, and the direction indicator 71 partially enters a recessed portion 73a formed in the mirror housing 73. Such a structure is realized by the large recessed portion 73a formed in a bottom part of the mirror housing 73 and a housing support portion 74 provided in the direction indicator 71 at a position inward of the tip thereof in the vehicle widthwise direction. A center line O representing the central position of the mirror housing 73 in the vehicle widthwise direction is located inward of an outer end part of the direction indicator lens surface 72 in the vehicle widthwise direction. This layout enables an increase of overlap between the mirror housing 73 and the direction indicator 71.

Figure 10:
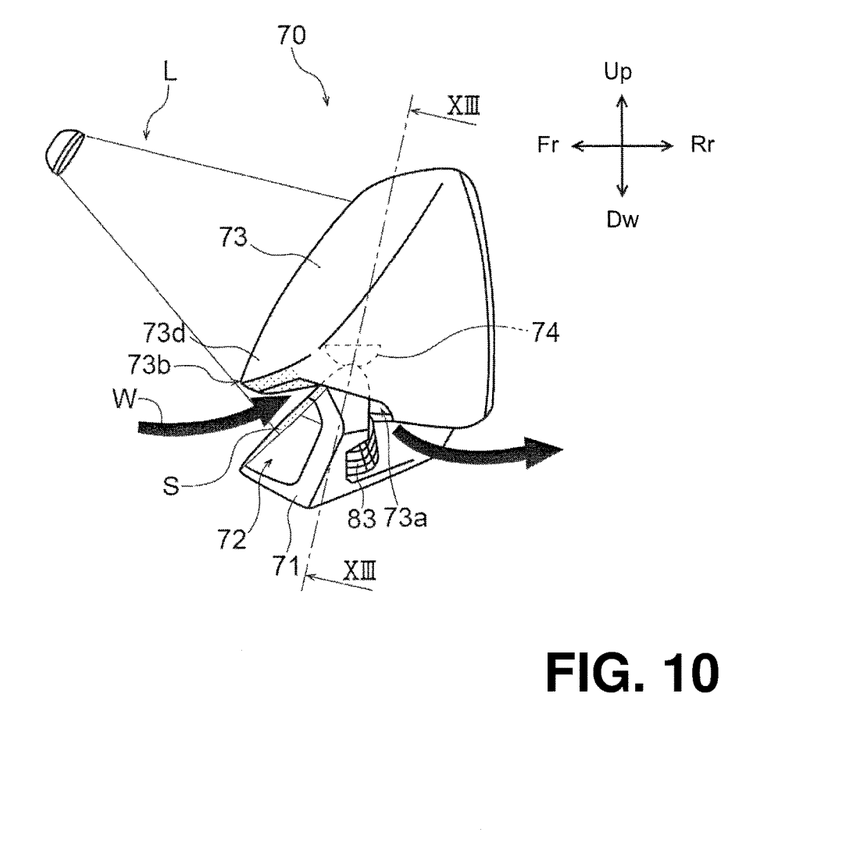
FIG. 10 is a left side view illustrating the portion of the rearview mirror overshadowed when the rearview mirror is irradiated with light.

In the front view of the rearview mirror 70, the direction indicator 71 overlaps a lower part of the mirror housing 73. Moreover, also in the left side view, a tip upper part of the direction indicator 71 enters the recessed portion 73a and these two overlap each other. With this structure, as illustrated in FIG. 10, light that falls on the direction indicator lens surface 72 from the front upper side can be shielded by an eaves portion 73d, which has a contour 73b protruding obliquely downward in a front lower part of the mirror housing 73 with respect to the vehicle body. The eaves portion 73d may, alternatively, be referred to as a projecting portion. As shown in the drawing, this projecting portion partially covers a vehicle-widthwise outer part of the direction indicator 71, and a front part of the projecting portion extends forward and downwardly with respect to the vehicle body, to provide a visor for the covered portion of the direction indicator. In addition, traveling wind W introduced through the space between the eaves portion 73d and the direction indicator lens surface 72 is discharged to the rear through the space between the direction indicator 71 and the recessed portion 73a, whereby a heat sink 83 provided in a rear part of the direction indicator 71 can be forcibly cooled by this wind.

Figure 9:
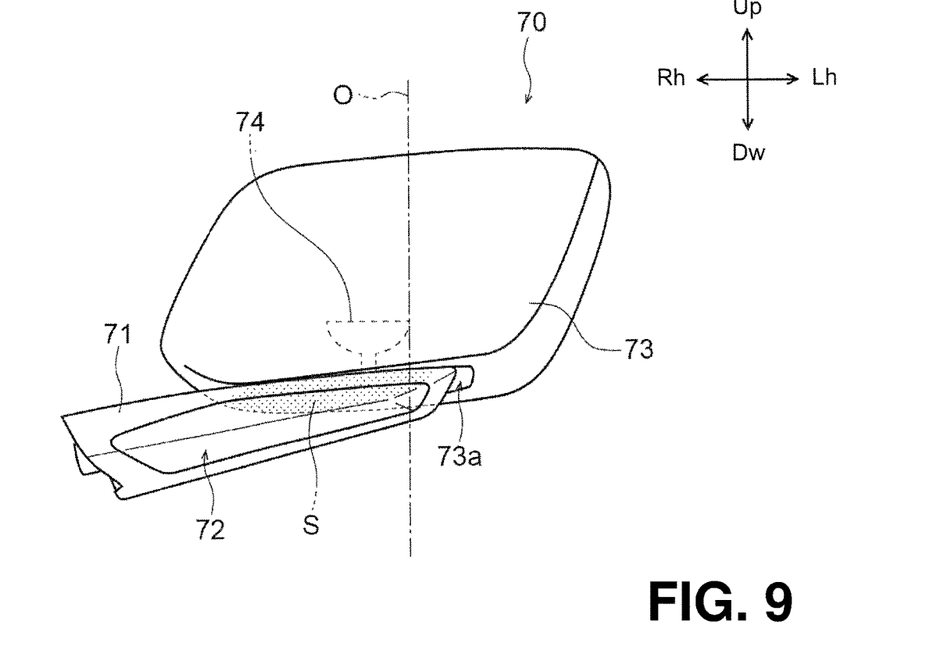
FIG. 9 is a plan view illustrating a portion of the rearview mirror overshadowed when the rearview mirror is irradiated with light.

FIGS. 9 and 10 are explanatory views illustrating a portion of the rearview mirror 70 overshadowed by the eaves portion 73d when the rearview mirror is irradiated with light L from its front upper side. As illustrated in the front view of FIG. 11 and the side view of FIG. 12, the eaves portion 73d protruding to the front lower side of the vehicle body shields the irradiation light L emitted toward the direction indicator lens surface 72 located behind and below the eaves portion, and makes a shadow S there (a dotted portion in the drawings). Thereby, even when the irradiation light L from the sunshine or headlights of vehicles in the opposing lane hits the rearview mirror, the blinking state of the direction indicator 71 can be favorably recognized at the shadow portion.

Figure 11:
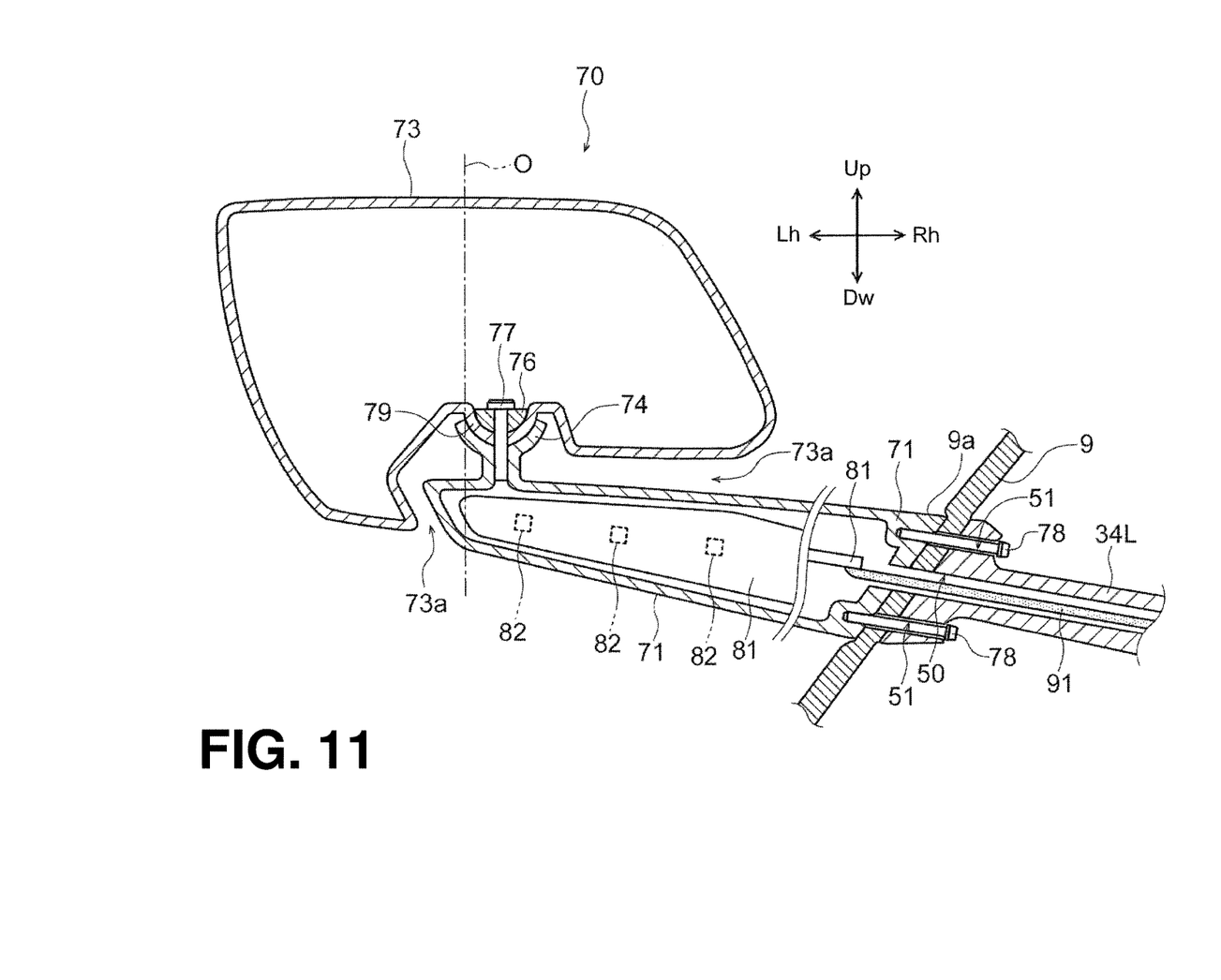
FIG. 11 is a sectional view taken along a line XI-XI in FIG. 8.
Figure 12:
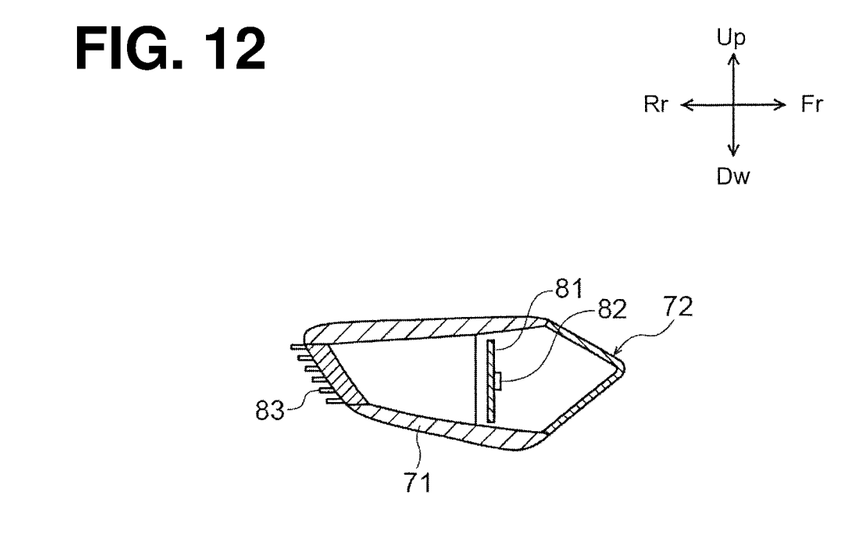
FIG. 12 is a sectional view taken along a line XII-XII in FIG. 7.

FIG. 11 is a sectional view taken along a line XI-XI in FIG. 8. In addition, FIG. 12 is a sectional view taken along a line XII-XII in FIG. 7. Note that, for explanatory purposes, the joint portion between the first laterally extending portion 34L and the direction indicator 71 illustrated in FIG. 11 is one that is cut in a substantially horizontal direction. The left rearview mirror 70 is fixed on the end part of the left first laterally extending portion 34L with two fastening bolts 78. More specifically, while the mounting portion 9a of the cowling 9 is interposed between the direction indicator 71 and the first laterally extending portion 34L, these direction indicator and mounting portion are jointly fastened with the fastening bolts 78 threaded through the fastening holes 51.

A board 81 having multiple direction indicator LED light sources 82 installed thereon is connected to an end part of a direction indicator harness 91 threaded through the eyelet 50 of the first laterally extending portion 34L. The LED light sources 82 are directed to emit light toward the front of the vehicle body, and configured so that irradiation light from them is directed in a predetermined direction by the direction indicator lens surface 72.

As illustrated in FIG. 12, the direction indicator lens surface 72 has a wedge shape splitting the traveling wind into upper and lower streams, and is configured so as to allow the traveling wind W introduced through the space between the eaves portion 73d and the direction indicator lens surface 72 to be discharged to the rear through the space between the direction indicator 71 and the recessed portion 73a while cooling the heat sink 83. Thus, the heat sink 83 can be actively cooled, whereby the amount of light emission from the LED light sources 82 can be increased with the downsized direction indicator 71.

The housing support portion 74 of the direction indicator 71 engages with a semispherical portion 79 formed in the mirror housing 73, and angularly adjustably supports the mirror housing 73 by engaging a ball joint 76 with the semispherical portion 79 from above and fixing the ball joint on the semispherical portion with a check pin 77. This angle adjustment mechanism may be varied in various ways, e.g., the application of a configuration of making the check pin bias the ball joint via a spring. Here, the above configuration may be changed to one in which the semispherical portion 79 is provided on the direction indicator 71 side and the housing support portion 74 is provided on the mirror housing 73 side.

As described previously, the housing support portion 74 for angularly adjustably supporting the mirror housing 73 is located slightly inward of the tip of the direction indicator 71. In existing direction indicators, a housing support portion is normally provided at the distal end of a direction indicator and no consideration has been made to actively overlap the direction indicator and a mirror housing with each other.

On the other hand, according to this embodiment, the housing support portion 74 is provided inward of and above the tip of the direction indicator 71, which increases the amount of overlap between the direction indicator 71 and the mirror housing 73 and thus increases an area of the direction indicator lens surface 72 overshadowed by the eaves portion 73d. Besides, since the direction indicator 71 and the mirror housing 73 overlap each other in the vehicle widthwise direction, the vehicle-widthwise size of the vehicle can be easily reduced.

The semispherical portion 79 engaging with the housing support portion 74 of the direction indicator 71 is provided on a ceiling surface of the recessed portion 73a formed in the mirror housing 73. In existing mirror housings, such a semispherical portion is provided on a vertical wall surface of a mirror housing, and thus the mirror housing is disposed on a rear part of a direction indicator and difficult to place on an upper part of the direction indicator.

On the other hand, according to this embodiment, since the recessed portion 73a is provided in the lower part of the mirror housing 73, the semispherical portion 79 can be formed on the ceiling surface of the recessed portion 73a. This enables the mirror housing 73 to be supported on its lower side and thus achieves a layout where the light shielding function of the eaves portion 73d easily works even when the motorcycle 1 banks for turning right or left at an intersection. In addition, since the semispherical portion 79 is formed on the ceiling surface of the recessed portion 73a and the housing support portion 74 is placed facing upward, the mirror housing 73 which is a heavy object is supported from below, which reduces a load to act on their joint portion and thereby suppresses the wear of the angle adjustment function.

Further, in the plan view, the mirror housing 73 overlaps the direction indicator 71 at least partially and covers the direction indicator 71 from above. Thus, even in the case where no irradiation light from the outside hits the direction indicator 71, this layout implements a design that emphasizes the direction indicator 71, which brings an effect of improvement in the visibility of the direction indicator.

Note that, the form of the motorcycle, the shape and structure of the direction indicator, the shapes of the mirror housing and the recessed portion, the layout and number of the LED elements, the shape of the direction indicator lens, and the like are not limited to those of the above examples and can be changed in various ways. The direction indicator and rearview mirror structure according to the present disclosure is applicable not only to motorcycles but also to various vehicles such as three-wheeled vehicles and four-wheeled vehicles.

The invention claimed is:

1. A combined direction indicator and rearview mirror structure for a vehicle, comprising:
   a direction indicator for a vehicle that selectively emits a forward blinking light for announcing a change of direction of said vehicle; and
   a rearview mirror having a mirror housing which supports a mirror body therein,
   wherein the mirror housing includes a projecting portion which partially covers a vehicle-widthwise outer part of the direction indicator, and in a side view, a front part of the projecting portion extends forward and downwardly with respect to a vehicle body, overshadowing the covered portion of the direction indicator;
   wherein the direction indicator angularly and adjustably supports said mirror housing,
   and wherein said mirror housing is mounted with at least a part thereof disposed above and in front of said direction indicator.

2. The direction indicator structure of a vehicle according to claim 1, wherein an outer end part of said direction indicator in a vehicle widthwise direction is located at a position outside a center of said mirror housing in the vehicle widthwise direction.

3. The direction indicator structure of a vehicle according to claim 2, wherein at least one light source is placed in said direction indicator at a position overlapping said mirror housing in a plan view.

4. The direction indicator structure of a vehicle according to claim 1, wherein a housing support portion which is provided on said direction indicator and angularly adjustably supports said mirror housing is placed, facing upward, at a position inward of the end part of said direction indicator.

5. A combined direction indicator and rearview mirror structure for a vehicle, comprising:
   a direction indicator for a vehicle that emits a forward blinking light for announcing a change of direction of said vehicle; and
   a rearview mirror having a mirror housing which supports a mirror body therein,
   wherein the direction indicator angularly and adjustably supports said mirror housing,
   wherein the mirror housing includes a projecting portion which partially covers a vehicle-widthwise outer part of the direction indicator, wherein said mirror housing is mounted with at least a part of said projecting portion disposed above and in front of said direction indicator, and in a side view, a front part of the projecting portion extends forward and downwardly with respect to a vehicle body, overshadowing the covered portion of the direction indicator; and
   wherein, in a top plan view, said mirror housing overlaps said direction indicator at least partially, and covers a portion of said direction indicator from above.

6. The direction indicator structure of a vehicle according to claim 5, wherein an outer end part of said direction indicator in a vehicle widthwise direction is located at a position outside a center of said mirror housing in the vehicle widthwise direction.

7. The direction indicator structure of a vehicle according to claim 6, wherein at least one light source is placed in said direction indicator at a position overlapping said mirror housing in a plan view.

8. The direction indicator structure of a vehicle according to claim 5, wherein:
a recessed portion which houses an upper part of a vehicle-widthwise outer part of said direction indicator is formed in a lower part of said mirror housing, and
in a side view, a front part of said recessed portion with respect to a vehicle body protrudes forward and downward with respect to the vehicle body, and serves as the projecting portion which covers a front upper part of said direction indicator.

9. The direction indicator structure of a vehicle according to claim 8, wherein
said direction indicator includes a heat sink which is exposed on a rear side of said direction indicator with respect to the vehicle body, and
a direction indicator lens surface of said direction indicator
has a wedge shape splitting traveling wind into upper and lower streams, and
is configured so as to allow the traveling wind introduced through a space between said projecting portion and said direction indicator lens surface to be discharged to a rear through a space between said direction indicator and said recessed portion while cooling said heat sink.

10. The direction indicator structure of a vehicle according to claim 9, wherein an outer end part of said direction indicator in a vehicle widthwise direction is located at a position outside a center of said mirror housing in the vehicle widthwise direction.

11. The direction indicator structure of a vehicle according to claim 5, wherein a housing support portion which is provided on said direction indicator and angularly adjustably supports said mirror housing is placed, facing upward, at a position inward of the end part of said direction indicator.

12. A direction indicator and rearview mirror structure for a vehicle, comprising:
a direction indicator for a vehicle that emits a forward blinking light for announcing a change of direction of said vehicle; and
a rearview mirror having a mirror housing which supports a mirror body,
wherein the direction indicator angularly and adjustably supports said mirror housing,
wherein said mirror housing is mounted with at least a part of said mirror housing disposed above and in front of said direction indicator,
wherein a recessed portion which houses an upper part of a vehicle-widthwise outer part of said direction indicator is formed in a lower part of said mirror housing, and
wherein in a side view, a front part of said recessed portion with respect to a vehicle body protrudes forward and downward with respect to the vehicle body and serves as an eaves portion which covers a front upper part of said direction indicator.

13. The direction indicator structure of a vehicle according to claim 12, wherein an outer end part of said direction indicator in a vehicle widthwise direction is located at a position outside a center of said mirror housing in the vehicle widthwise direction.

14. The direction indicator structure of a vehicle according to claim 13, wherein at least one light source is placed in said direction indicator at a position overlapping said mirror housing in a plan view.

15. The direction indicator structure of a vehicle according to claim 12, wherein
said direction indicator includes a heat sink which is exposed on a rear side of said direction indicator with respect to the vehicle body, and
a direction indicator lens surface of said direction indicator
has a wedge shape splitting traveling wind into upper and lower streams, and
is configured so as to allow the traveling wind introduced through a space between said eaves portion and said direction indicator lens surface to be discharged to a rear through a space between said direction indicator and said recessed portion while cooling said heat sink.

16. The direction indicator structure of a vehicle according to claim 15, wherein an outer end part of said direction indicator in a vehicle widthwise direction is located at a position outside a center of said mirror housing in the vehicle widthwise direction.

17. The direction indicator structure of a vehicle according to claim 12, wherein a housing support portion which is provided on said direction indicator and angularly adjustably supports said mirror housing is placed, facing upward, at a position inward of the end part of said direction indicator.

* * * * *